United States Patent [19]

Henery et al.

[11] 4,099,964

[45] Jul. 11, 1978

[54] RECYCLING OF IRON VALUES

[75] Inventors: Maurice D. Henery, Evanston; Ernest B. Snyder, South Holland; Walter W. Walker, Matteson, all of Ill.

[73] Assignee: Marblehead Lime Company, Chicago, Ill.

[21] Appl. No.: 772,933

[22] Filed: Feb. 28, 1977

Related U.S. Application Data

[63] Continuation of Ser. No. 662,943, Mar. 1, 1976, abandoned.

[51] Int. Cl.² .......................... C21C 7/00; C21C 5/36
[52] U.S. Cl. .......................................... 75/52; 75/24; 75/60
[58] Field of Search ...................... 75/25, 52, 60, 24, 5

[56] References Cited

U.S. PATENT DOCUMENTS

| | | | |
|---|---|---|---|
| 3,189,436 | 6/1965 | Burstlein | 75/5 |
| 3,311,465 | 3/1967 | Ban | 75/5 |
| 3,460,934 | 8/1969 | Kelmar | 75/25 |
| 3,721,548 | 3/1973 | Hodge | 75/25 |
| 3,754,889 | 8/1973 | Dominguez | 75/3 |
| 3,771,999 | 11/1973 | Fedock | 75/60 |
| 3,857,698 | 12/1974 | Gilpin | 75/24 |

*Primary Examiner*—Peter D. Rosenberg
*Attorney, Agent, or Firm*—McDougall, Hersh & Scott

[57] ABSTRACT

A method for recycling iron values such as the iron which is present in the iron oxide, primarily $Fe_3O_4$ found in millscale and other fine or waste materials containing oxides of iron. The method is applicable to basic oxygen refining operations wherein iron is charged to the basic oxygen furnace along with a flux. The method can also be applied to other iron or steel-making furnaces. In accordance with the invention, a portion of the flux charged to the furnace is prepared by forming a mixture of iron or iron containing particles with the balance comprising dolomite, the mixture including sufficient iron values such that the product after calcination will contain in excess of 20 percent and up to 50 percent by weight iron values, calculated as $Fe_2O_3$. The mixture is heated in a kiln to a temperature in excess of 2000° F. whereby reaction products such as calcium and magnesium ferrites are formed and make up a substantial portion of the mixture. The mixture is then introduced as a part of the flux utilized in the furnace, the mixture preferably comprising from 20 to 100 percent of the dolomitic lime which would normally be utilized in said flux charge.

5 Claims, No Drawings

RECYCLING OF IRON VALUES

This is a continuation of application er. No. 662,943, filed Mar. 1, 1976 and now abandoned.

This invention is concerned with the recycling of iron values. The invention is particularly concerned with the efficiency of iron refining operations through the utilization of iron oxide materials or metallics which would normally not be suitable for use as a charge in a refining operation.

It is well known that large amounts of so-called waste materials containing iron values are produced in steel-making operations. Millscale comprises a large portion of such materials, and the discussion hereinafter will be directed to the utilization of the iron values present in such materials. It will be understood, however, that the invention is considered to be applicable to the utilization of iron values from material of a similar character including particulate iron ore and other waste materials produced in the course of steel-making operations or other operations which result in the collection of significant amounts of iron oxide or other iron particles.

The utilization of the iron values in materials of the type described has the obvious advantage of providing additional sources of iron and steel. Furthermore, waste materials of the type referred to are known to produce severe pollution problems. The recycling of such materials significantly reduces disposal problems whereby an important additional advantage is achieved with the practice of the invention.

It is a general object of this invention to provide an improved technique for utilizing the iron values from iron materials such as particulate iron or iron oxide.

It is a more specific object of this invention to provide a method for improving the efficiency of refining operations by utilizing the iron values present in millscale and similar materials which might otherwise be considered waste materials.

These and other objects of this invention will appear hereinafter, and it will be understood that the specific examples hereinafter set forth are provided for purposes of illustration and not for purposes of limitation.

The method of this invention generally relates to the utilization of iron values in material which has often been considered to be waste material. The method is particularly applicable for use in association with a basic oxygen refining process wherein iron is introduced into a basic oxygen furnace. In the normal operation of such a furnace, oxygen is blown into the iron bath for the oxidation of silicon, manganese, phosphorus and carbon, and for removal of the thus oxidized material. In such operations, a flux forms part of the furnace charge, the flux normally consisting of lime, including a portion of dolomitic lime, and an auxiliary flux material such as fluorspar. During the operation, the furnace contains the molten iron bath and an overlying slag layer which is formed by chemical combination of the flux materials and the oxidized metallic elements (silicon, manganese, phosphorus and some iron).

In the preferred practice of this invention, a mixture is prepared by forming a mixture of iron or iron containing particles with the balance comprising dolomite, the mixture including sufficient iron values such that the product after calcination will contain in excess of 20 percent and up to 50 percent by weight iron values, calculated as $Fe_2O_3$. The dolomite comprises a combination of calcium and magnesium carbonate, and it will be understood that where reference is made herein to "dolomite", that term shall include materials such as magnesian limestone which have the required calcium and magnesium carbonate contents. The iron particles are defined as any of the valence states of Fe and its oxides, hydroxides, and carbonates, and combinations thereof. The thus prepared mixture is heated in a kiln to a temperature in excess of 2000° and up to 3000° F. whereby reaction products are formed.

The mixture which is produced in accordance with this invention is preferably introduced into the BOF along with the flux additions. The dolomitic lime portion of a normal flux typically comprises from 15 to 60 pounds per ton of steel produced.

This invention contemplates the substitution of the mixture obtained from the kiln for all or part of this dolomitic lime portion of the flux. Specifically, the mixture may be employed as a substitute for from 20 to 100 percent of the dolomitic lime portion of the flux charge.

The iron or iron oxide particles which are employed in the mixture in the kiln will usually comprise millscale which is a material readily available, and which, therefore, comprises a highly desirable source of useful iron. The recycling and/or the disposal of millscale as waste has created considerable pollution problems and other problems. Accordingly, this invention provides solutions to such pollution problems in addition to providing more efficient use of iron resources. It will be appreciated that particles of a character similar to millscale could also be utilized in the formation of applicants' mixtures, including other iron bearing materials such as iron and iron oxide fines obtained in steel making operations, and iron oxide fines obtained in mining operations.

It will be appreciated that the mixture which applicants obtain from the kiln contains a high percentage of iron values whereby a significant amount of additional iron is realized from each BOF heat when compared with heats obtained using regular procedures. In a typical mixture obtained from the kiln, the amount of iron oxide, calculated as $Fe_2O_3$, will be in excess of 20 percent by weight.

In an example of the practice of the invention, the kiln is charged with dolomitic stone at a rate of approximately 13 tons per hour. A continuous operation is involved with millscale being added to the stone at a rate between about 2 and 3.5 tons per hour for admixture with the stone, the rate of addition of the millscale being varied with the coarseness of the material and being controlled to achieve the minimum requirement for iron values in the product of the kiln.

The kiln is utilized for heating the dolomite to a temperature in excess of 2100° F. thereby driving off carbon dioxide. The millscale is preferably mixed with the dolomitic material and located on a belt conveyor or the like for introduction into the kiln. In the kiln, the millscale reacts with the dolomitic material to form reaction products which may include oxides, ferrites, and complex combinations thereof. The following comprises an analysis of a typical kiln product, it being understood that the reference to $Fe_2O_3$ is made as a convenient means of reflecting the iron content and is not intended to express the actual iron compounds involved which, as indicated, are typically of a complex nature:

$SiO_2$—1.07%
$Fe_2O_3$—22.24%
$Al_2O_3$—0.42%

CaO—42.26%
MgO—33.13%
S—0.014%
L.O.I.—0.83%

The mixture thus obtained was introduced into a BOF along with the flux in a refining operation. In this instance, the total charge of mixture and flux was 150 pounds per ton with the mixture comprising 50 pounds per ton of that amount. The slag obtained after pouring of the heat did not reveal any significant additional percentage of iron values when compared with analyses of slag from BOF operations run without the use of the mixture. This is believed to confirm that the iron values present in the mixture are recovered in the metal bath, thus increasing the over-all yield. More specifically, it is recognized that in a typical BOF operation, the amount of iron oxide in the slag reaches an equilibrium for any given set of operating conditions. This equilibrium level will typically be from 12 to 25 percent by weight of the slag calculated as FeO. The presence of the iron values in the mixture in accordance with the concepts of this invention provides a source of iron oxide to satisfy the equilibrium of oxide in the slag thereby reducing or eliminating the normal loss of iron values from the bath to the slag during a refining operation. The heat balance in the refining operation using the mixture of this invention was also otherwise of standard character, that is, no steel temperature loss was observed by reason of the use of the mixture in any test heats.

In the foregoing example, reference is made to the formation of a mixture of millscale or other iron-rich particles with the dolomite followed by the introduction of the mixture into the kiln. It will be appreciated that the invention contemplates the addition of the millscale to the kiln at various locations therealong, for example subsequent to heating of the dolomite above 2000° F. with the formation of reaction products occurring toward the end of the kiln cycle.

The procedures of this invention represent significant improvements when considering prior efforts to recycle or dispose of millscale and similar iron values. Such attempts usually have involved sintering of the oxides, charging to the blast furnace, and then refining in the BOF. This invention, of course, by-passes the sintering and blast furnace operations.

It will be understood that various changes and modifications may be made in the invention described without departing from the spirit of the invention, particularly as defined in the following claims.

That which is claimed is:

1. In the operation of a basic oxygen furnace wherein iron is introduced along with a flux addition to provide a furnace charge for refining the iron, said flux addition including dolomitic lime in amounts between 15 and 60 pounds per ton of furnace charge, a slag layer being formed in the furnace and an equilibrium condition of iron oxide content calculated as FeO being developed between the slag layer and the metal bath, the improvement comprising a method for recycling iron values from compounds comprising iron and iron oxide, said method comprising the steps of preparing a mixture by mixing such compounds in particulate form together with dolomite, the mixture including sufficient iron values such that the reaction products after calcination will contain in excess of 20 percent and up to 50 percent by weight iron values, calculated as $Fe_2O_3$, providing such calcination by heating the mixture in a kiln to a temperature in excess of 2000° F. whereby the output of the kiln comprises said reaction products, forming said flux addition by substituting said output in the flux addition in an amount from 20 to 100 percent of said dolomitic lime portion of the flux, and introducing the flux addition including said output from the kiln into said furnace along with said iron, said slag layer being enriched in iron oxide by reason of the presence of said output in said flux addition whereby the depletion of iron values from said bath in order to reach said equilibrium condition is substantially minimized.

2. A method in accordance with claim 1 including the step of introducing the dolomite into the kiln, heating the dolomite to a temperature of at least about 2000° F., and thereafter adding said particles to the kiln.

3. A method in accordance with claim 1 wherein said mixture is heated to a temperature between 2000° and 3000° F.

4. A method in accordance with claim 1 wherein said particles comprise at least one member selected from the group consisting of iron and the carbonates, hydroxides and oxides of iron.

5. A method in accordance with claim 4 wherein said particles comprise millscale.